3,362,957
PROCESS FOR THE PRODUCTION OF GAMMA QUINACRIDONES

William A. West, Westfield, N.J., assignor to E. I. du Pont de Nemours and Company, Wilmington, Del., a corporation of Delaware
No Drawing. Original application Oct. 21, 1965, Ser. No. 500,213, now Patent No. 3,326,918. Divided and this application Feb. 8, 1967, Ser. No. 627,240
3 Claims. (Cl. 260—279)

This application is a division of application Ser. No. 500,213, filed Oct. 21, 1965, now U.S. Patent No. 3,326,918.

This invention relates to an improved process for the preparation of quinacridone pigments in very small particle size and more particularly to the acid pasting of quinacridones such that they are precipitated from solution in a predetermined crystalline form of small particle size.

It is common practice to purify certain pigments and reduce their particle size, i.e., to specific surface greater than 50 m.$^2$/g., by a process commonly referred to as "acid pasting." The method usually involves solution of the crude pigment in a concentrated acid, such as sulfuric or polyphosphoric acid, followed by precipitation of the pigment by dilution of the acid solution with water. When this process is applied to quinacridone, the pigment is regenerated in small particle size and in a higher state of purity, as expected. This process, however, invariably leads to the formation of the alpha crystal phase, U.S. Patent 2,884,484, which is the least stable form and hence the least desirable. The two more stable crystalline forms of quinacridone, viz., the violet beta form, U.S. Patent 2,844,485, and the red gamma form, U.S. Patent 2,844,581, are normally obtained by specific milling techniques as disclosed in the cited patents.

Other methods of preparing quinacridones in either the beta or gamma form have recently been claimed. Thus, for example, the beta form may be prepared by hydrolysis of an aluminum chloride-quinacridone complex, U.S. Patent 3,148,191, by alcoholysis of a polyphosphoric acid solution of quinacridone, French Patent 1,233,785, or by acid pasting quinacridone with methyl sulfuric acid, British Patent 979,289. Likewise, in the co-pending application of Jaffe, Ser. No. 165,234, filed Jan. 9, 1962, a new method of preparing the gamma form of quinacridone by controlled hydrolysis of a phosphoric acid solution thereof is taught. However, nowhere has there been any suggestion, let alone teaching, that either the beta or the gamma form a quinacridone may be obtained directly from sulfuric acid solution.

It is an object of this invention to prepare quinacridone pigments of small particle size and of high purity by precipitation thereof from sulfuric acid solution under conditions whereby the crystalline phase of the quinacridone may be controlled as desired. It is a further object of this invention to prepare quinacridone pigments in either the violet beta form or the red gamma form by acid pasting in sulfuric acid and subsequent precipitation of the pigment in the predetermined form.

It has now been found that quinacridone may be precipitated from sulfuric acid solution under conditions leading to either the beta or gamma crystal form as desired, while simultaneously preserving the quinacridone in uniformly small particle size and a high state of purity, both of which properties are characteristic of the acid pasting process. For the attainment of either the beta or gamma form, the precipitation is carried out in the presence of an aromatic sulfonic acid. For the specific preparation of the gamma form, the processing is further conducted at relatively high temperature and in the presence of quinacridone sulfonic acid.

For a clearer understanding of the invention, the following specific examples are given. These examples are intended to be merely illustrative of the invention and not in limitation thereof. Unless otherwise specified, all parts are by weight.

Example I–A.—Beta phase

A mixture of 140 parts of sulfuric acid (96 to 98%) and 21 parts of toluene is warmed and stirred at 90° C. for 5 minutes. The solution is cooled to 30° C. and 20 parts of quinacridone in dry form is added. The crystal form of quinacridone is of no significance at this point. The mixture is warmed at 65° C. for 30 minutes, at the end of which time solution of the quinacridone is virtually complete. This solution is then dripped into 1000 parts of boiling water. The precipitate is isolated by filtering, washing acid free and drying. The pigment obtained is a violet of high strength and brightness, and shows the characteristic X-ray diffraction pattern of the beta modification. If the addition of toluene is omitted or if the temperature of the water used in hydrolysis is significantly lowered, the product is predominantly in the alpha phase.

Example I–B.—Alternate beta phase

The procedure of Example I–A is followed until solution of the quinacridone is virtually complete. This solution is introduced as rapidly as possible through a jet under high turbulence into 600 parts of water at room temperature. The mixture is then heated to the boil and maintained at this temperature for 1 hour; following which the pigment is isolated in the conventional manner. The product is shown to have the characteristic X-ray diffraction pattern of the beta modification.

Example II

The procedure of Example I is followed in detail, except that 21 parts of xylene (any isomer may be used) is substituted for the 21 parts of toluene of Example 1. The product obtained is similar in all respects to that of Example I.

Example III

The procedure of Example I is repeated, except that 21 parts of naphthalene is substituted for the 21 parts of toluene. The product obtained is similar to that of Example I.

Example IV

To 120 parts of concentrated sulfuric acid (96 to 98%) is added to 20 parts of quinacridone, and the mixture is stirred at 40° to 45° C. until solution is complete. Then 20 parts of p-toluene sulfonic acid is added and stirring is continued for 15 minutes. The pigment is precipitated by adding the solution to boiling water as in Example I–a. The product is isolated by conventional means, and is similar in all respects to that of Example I.

Example V.—Gamma phase

To 80 parts of sulfuric acid (98%) are added 20 parts of quinacridone and 1 part of quinacridone sulfonic acid, Ser. No. 312,863, filed Oct. 1, 1963. The mixture is stirred at 55° C. for 15 minutes; then 25 parts of toluene is added, and stirring is continued at 70° to 75° C. for 30 minutes. The quinacridone solution is dripped into a refluxing solution of 60 parts of glacial acetic acid in 240 parts of water. After refluxing for 15 minutes, the product is isolated by filtration and washed acid free. The pigment obtained shows the characteristic X-ray diffraction pattern of gamma phase quinacridone and exhibits outstanding tinctorial strength and color intensity when dispersed in an oleoresinous vehicle.

Example VI

The procedure of Example V is duplicated except that 25 parts of xylene is substituted for the 25 parts of toluene. The product obtained is in the gamma form and is similar in all respects to that of Example V.

Example VII

To 80 parts of concentrated sulfuric acid are added 20 parts of quinacridone and 1 part of quinacridone sulfonic acid. The mixture is stirred at 55° C. for 15 minutes; then 32 parts of toluene is added, and stirring is continued for 30 minutes at 75° to 80° C. The resulting quinacridone solution is dripped into a vigorously stirred solution of 100 parts of acetic acid in 200 parts of water at 25° C. The mixture is heated and refluxed for 30 minutes. The product is isolated by conventional means. It shows the characteristic X-ray diffraction pattern of the gamma phase and exhibits color characteristics similar to those of the pigment obtained in Example V.

The distinctive feature in common to both the beta and gamma processes described is the use of an aromatic sulfonic acid therein. This may be preformed, as in the case of the p-toluene sulfonic acid of Example IV, or it may be generated in situ, as in Example I and the other examples wherein it is the aromatic hydrocarbon per se that is added. It has been demonstrated that no free toluene remains in the reaction mixture of Example I at the time when the quinacridone is introduced. This was done by diluting the acid solution with water and subjecting the diluted mixture to steam distillation, whereupon not a trace of toluene was detectable in the distillate. Although the examples have shown only three aromatic hydrocarbons which may be used, nevertheless others, such as benzene, biphenyl and the like may be employed. The requirements for their utility are that they should be readily sulfonated under the conditions of the reaction and should remain in solution in the concentrated acid medium. Since the sulfonic acids of hydrocarbons of relatively high molecular weight when used in equivalent amount tend to dilute the final pigment, their use is not favored. In addition, the lower cost of the hydrocarbons of lower molecular weight tends to make them preferred.

The quantity of toluene or other aromatic hydrocarbon may be varied within limits. Doubling the amount in Example I may hinder the complete solution of the quinacridone and is, therefore, to be avoided. Decreasing the amount in Example I by 33% results in a yellower product, containing 20 to 30% of the alpha phase. Omission of the toluene in Example I gives a product which is predominantly alpha phase, i.e., the acid pasted quinacridone of the prior art.

Lowering the temperature of the dilution water (Example I–A) to 80° C. gives a product that is much yellower and may contain up to 35% of alpha phase. If the water temperature is 45° C. or below, the product obtained is almost entirely alpha phase. However, if the drowning is performed at such low temperatures and the reaction mixture is subsequently heated to the boil (as in Example I–B), the resulting pigment is predominantly in the beta form.

In the preparation of the gamma phase pigment, omission of the quinacridone sulfonic acid leads to contamination with beta phase at dilution water temperature below the boiling point but above 80° C., and alpha phase at temperatures below 45° C. Addition of quinacridone sulfonic acid to the dilution water tends to favor the formation of the gamma phase. If the latter modification is performed at a temperature below 50° C. in the presence of 5% quinacridone sulfonic acid (by weight of the quinacridone used), the pigment is initially formed in the alpha phase, but subsequent refluxing for one hour results in complete conversion to the gamma phase.

In the preparation of gamma phase the preferred ratio of pigment to sulfuric acid is 1:4, as indicated in the examples. Increasing the quantity of sulfuric acid to the point where the ratio becomes 1:7 leads to contamination of the product with 20 to 30% of the beta phase.

It is possible to generate the gamma phase without resorting to the addition of acetic acid to the diluting water. However, the presence of the acetic acid is desirable to insure maximum yellowness and intensity in the product, both being the result of the absence of the beta modification therein.

This invention permits the preparation of quinacridone pigments in either the beta or gamma form in high purity, both with respect to freedom from contamination with other crystalline phases and with non-quinacridone materials. Consequently, the resulting products exhibit tinctorial properties (tinting strength, clarity of hue, intensity) superior to their counterparts of the prior art.

The processes of the invention are attractive economically because they are based on the well-known and proven technique of acid pasting in sulfuric acid. This is one of the most efficient methods known to prepare quinacridone and other pigments (phthalocyanines, vat dyes, etc.) in the desired small particle size and high purity. Since both of these goals are achieved simultaneously, further complication of additional steps is avoided. Furthermore, the acid pasting has the advantage over the prior art milling methods in that it does not require the costly mechanical steps and special equipment of the latter.

I claim:
1. A process for the preparation of gamma phase linear quinacridone of specific surface greater than 50 square meters per gram comprising:
    (a) dissolving quinacridone in sulfuric acid,
    (b) adding to the solution a compound having the formula RX, wherein R is an aromatic radical selected from the group consisting of phenyl, tolyl, xylyl, and naphthyl, and X is hydrogen or sulfonic acid,
    (c) adding to the solution 0.01 to 0.10 part of quinacridone sulfonic acid per part of quinacridone,
    (d) introducing said solution into a mixture of acetic acid and water in which the proportion of acetic acid is from 0 to 50%, and
    (e) heating the mixture at reflux temperature.
2. The process of claim 1 wherein RX is toluene.
3. A process for the preparation of gamma phase linear quinacridone of specific surface greater than 50 square meters per gram comprising:
    (a) dissolving the quinacridone in sulfuric acid,
    (b) adding to the solution a compound of the formula RX, wherein R is an aromatic radical selected from the group consisting of phenyl, tolyl, xylyl and naphthyl, and X is hydrogen or sulfonic acid,
    (c) introducing said solution into a mixture of acetic acid and water in which the proportion of acetic acid is from 0 to 50%, said mixture also containing 0.01 to 0.10 part of quinacridone sulfonic acid per part of quinacridone, and
    (d) heating the mixture at reflux temperature.

References Cited
UNITED STATES PATENTS 3,200,122   8/1965   Streiff _____ 260—279

ALEX MAZEL, *Primary Examiner.*
D. G. DAUS, *Assistant Examiner.*